(12) United States Patent
Haas (10) Patent No.: US 7,621,450 B2
(45) Date of Patent: Nov. 24, 2009

(54) VOTE BY MAIL SYSTEM THAT ALLOWS VOTERS TO VERIFY THEIR VOTES

(75) Inventor: Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 82 days.

(21) Appl. No.: 11/961,116

(22) Filed: Dec. 20, 2007

(65) Prior Publication Data

US 2009/0159655 A1 Jun. 25, 2009

(51) Int. Cl.
*G06K 17/00* (2006.01)
*G07C 13/00* (2006.01)
*G06F 11/00* (2006.01)

(52) U.S. Cl. ......................................... 235/386; 705/12
(58) Field of Classification Search ........................ None
See application file for complete search history.

(56) References Cited

U.S. PATENT DOCUMENTS

| | | | | |
|---|---|---|---|---|
| 1,822,997 | A * | 9/1931 | Moore | ......................... 229/306 |
| 4,717,177 | A | 1/1988 | Boram | |
| 5,189,288 | A | 2/1993 | Anno et al. | |
| 6,457,643 | B1 | 10/2002 | Way | |
| 6,540,138 | B2 * | 4/2003 | Hall et al. | .................... 235/386 |
| 6,726,090 | B1 * | 4/2004 | Kargel | .......................... 235/51 |
| 6,779,727 | B2 * | 8/2004 | Warther | ................. 235/462.01 |
| 6,817,515 | B2 | 11/2004 | Winnett | |
| 6,865,543 | B2 | 3/2005 | Gibbs, Sr. | |
| 6,968,999 | B2 * | 11/2005 | Reardon | ...................... 235/386 |
| 6,971,574 | B1 * | 12/2005 | Herskowitz | .................. 235/386 |
| 6,991,161 | B2 | 1/2006 | Pazniokas | |
| 7,054,829 | B2 * | 5/2006 | Campo et al. | .................. 705/12 |
| 7,178,730 | B1 * | 2/2007 | Jamison et al. | ............. 235/386 |
| 7,210,617 | B2 | 5/2007 | Chaum | |
| 7,427,025 | B2 * | 9/2008 | Poulin et al. | ................. 235/386 |
| 7,451,928 | B2 * | 11/2008 | Peterson | ...................... 235/386 |
| 2002/0019767 | A1 | 2/2002 | Babbitt et al. | |
| 2002/0083126 | A1 * | 6/2002 | Best et al. | .................... 709/203 |
| 2002/0133396 | A1 | 9/2002 | Barnhart | |
| 2002/0161628 | A1 * | 10/2002 | Lane Poor et al. | ............. 705/12 |
| 2003/0062411 | A1 | 4/2003 | Chung et al. | |
| 2005/0061866 | A1 * | 3/2005 | Ackley et al. | ............... 229/306 |
| 2006/0053084 | A1 * | 3/2006 | Haas et al. | ................... 705/410 |
| 2006/0053085 | A1 * | 3/2006 | Guyett et al. | ............... 705/410 |

* cited by examiner

*Primary Examiner*—Michael G Lee
*Assistant Examiner*—Suezu Ellis
(74) *Attorney, Agent, or Firm*—Brian A. Lemm; Angelo N. Chaclas (57) ABSTRACT

A method of enabling a voter to verify that a ballot has been received and counted as intended in a vote by mail election that includes receiving the ballot from the voter in the mail, generating a vote verification mechanism for the voter, obtaining the voter's votes from the ballot and counting the votes in the election. The method further includes storing voter vote information including the voter's votes that were counted in the election, providing to the voter the vote verification mechanism and an acknowledgment that the ballot has been received and counted, and, after the election has been closed, receiving the vote verification mechanism from the voter, obtaining the voter vote information from storage using the vote verification mechanism, and displaying the voter vote information for the voter so that the voter can verify that his or her votes have in fact been counted as intended.

16 Claims, 9 Drawing Sheets

VOTE BY MAIL SYSTEM THAT ALLOWS VOTERS TO VERIFY THEIR VOTES

FIELD OF THE INVENTION

The present invention relates to voting systems, and in particular to a vote by mail system that that enables voters to verify that their ballots have been received and that their votes have been counted as intended.

BACKGROUND OF THE INVENTION

In democratic countries, governmental officials are chosen by the citizens in an election. Conducting an election and voting for candidates for public office can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he or she must go to the polling place at which he or she is registered, based on the voter's residence. Another method for conducting an election and voting utilizes paper ballots that are mailed to the voter who marks the ballot and returns the ballot to the voting authority running the election through the mail. In the usual vote by mail process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent his/her human or machine readable identification.

In a typical vote by mail system, the envelopes that are returned to the registrar's office which include completed ballots undergo two separate processes. The first process is an authentication process in which the signature of the voter provided on the return envelope is verified against his or her registration signature. If the signatures match, the return envelope including the completed ballot is stored for later counting. If the signatures don't match, or if the signature is missing from the return envelope, an investigation is commenced during which the registrar normally contacts the voter. Typically, the signatures provided on the back of the return envelopes are verified without revealing the ballot inside. The second process occurs at the closing of the election and consists of the counting of the votes from all of the ballots that have been received in return envelopes that have been authenticated as just described. Typically, the authenticated return envelopes are loaded onto a machine that opens the envelopes, extracts the ballots, reads the ballots, tallies the votes, and outputs the emptied envelopes and the ballots into two separate bins (the ballots then may be further divided into two sub-bins, one for the ballots successfully read and one for the ones that fail to be read properly).

In current vote by mail systems, the voter has no way to know whether his or her returned ballot actually reached the registrar's office, was counted, and was in fact counted as intended. In some recent elections, there have been reports of absentee ballots that have been lost or forgotten behind at the registrar's office, for one reason or another, and, as a result, have not been counted. In order to gain more confidence from voters, there is a need for a system which gives the voters assurances that their votes have not been lost and have entered the vote tallying process and been counted as intended. This is especially true as voting by mail becomes more prevalent (apart from the usual absentee voting). In fact, in some jurisdictions, entire elections are being conducted exclusively by mail. Thus, their exists a need for a vote by mail system that allows voters to verify that their votes as indicated on a returned ballot have been received and counted as intended.

SUMMARY OF THE INVENTION

The present invention provides a method of enabling a voter to verify that the voter's ballot has been received and counted as intended by the voter in a vote by mail election. The method, in one embodiment, includes receiving the ballot from the voter in the mail, generating a vote verification mechanism for the voter, obtaining the voter's one or more votes from the ballot and counting the voter's one or more votes in the election. The method further includes storing voter vote information including the voter's one or more votes that were counted in the election, providing to the voter the vote verification mechanism and an acknowledgment that the ballot has been received and counted in the election, and, after the election has been closed, receiving the vote verification mechanism from the voter, obtaining the voter vote information from storage using the vote verification mechanism, and displaying the voter vote information for the voter so that the voter can verify that his or her votes have in fact been counted as intended.

In the preferred embodiment, the vote verification mechanism is a vote verification number that is generated by, for example, a pseudo random number generator. In that embodiment, the method further includes generating and storing a vote authentication number for the voter, and computing a vote identification tag for the voter based on the vote authentication number and the vote verification number, wherein the step of storing the voter vote information comprises storing the voter vote information in association with the vote identification tag, and wherein the step of obtaining the voter vote information from storage comprises (i) obtaining the vote authentication number from storage based on the identity of the voter, (ii) using the received vote verification number and the obtained vote authentication number to generate the vote identification tag, and (iii) using the generated vote identification tag to obtain the voter vote information from storage. Further, the step of computing the vote identification tag for the voter based on the vote authentication number and the vote verification number may include computing the vote identification tag using a hash function by using the vote authentication number as a first argument in the hash function and the vote verification number as a second argument in the hash function.

The step of receiving the ballot from the voter in the mail may include receiving the ballot in a return envelope, wherein the remaining steps of the method are performed only if the return envelope is able to be authenticated, preferably by using a signature provided on the return envelope.

In addition, the step of providing to the voter the vote verification mechanism and an acknowledgment that the ballot has been received and counted in the election preferably includes mailing a mailpiece to the voter that includes the vote verification mechanism and the acknowledgment. The mailpiece may be created from the return envelope received form the voter. In one particular embodiment, the return envelop includes a portion having a mailing address of the voter provided thereon, and the mailpiece is created from that portion. Furthermore, the return envelope may comprise a flap, a front and a back, wherein the back is the portion having the mailing address of the voter provided thereon, and wherein the mailpiece is created by separating at least part of the back from the front and the flap and printing the vote verification mechanism and the acknowledgment on part of the back. In another particular embodiment, the return envelope includes a flap having a perforation, a front and a back, wherein the back is the portion having the mailing address of the voter provided thereon, and wherein the mailpiece is created by removing a part of the flap from the return envelope by separating, along the perforation, that part of the flap from the remaining portion of the flap that is adhered to the back of the envelope, thereby exposing the mailing address of the voter, and printing the vote verification mechanism and the acknowledgment on the back of the envelope.

In an alternative embodiment, the step of providing to the voter the vote verification mechanism and an acknowledgment that the ballot has been received and counted in the election comprises providing the vote verification mechanism and the acknowledgment through one of a phone call placed to the voter, an email sent to the voter and a posting provided on a website accessible by the voter.

The method may also further include separating the ballot from the return envelope, printing the vote identification tag on the ballot and storing the ballot.

In another particular embodiment, the method includes providing a kiosk for enabling the voter to privately provide the vote verification mechanism for use in the method.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

The present invention provides a vote by mail system which gives confidence to a voter that his or her vote was received by the registrar's office and was in fact counted as intended. As described in greater detail below, the present invention employs a voting receipt (which may take a number of different forms) which is returned to the voter which assures the voter that his or her ballot was in fact received by the registrar's office. The present invention also employs a vote identification tag (VIT) which enables the voter to securely verify that his or her vote was counted in the election as the voter intended (i.e., as the voter indicated on his or her ballot that was returned).

Figure 1:
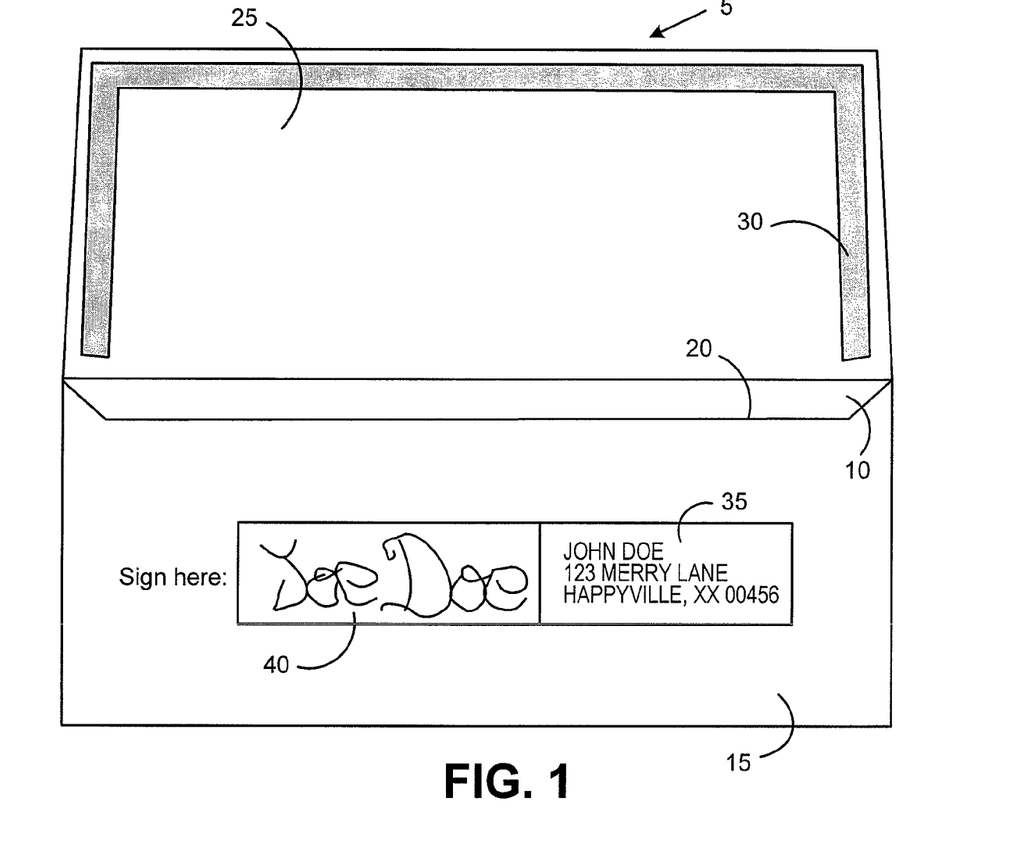
FIGS. 1 and 2 are schematic illustrations of an embodiment of a return envelope that may be employed in the vote by mail system of the present invention.
Figure 2:
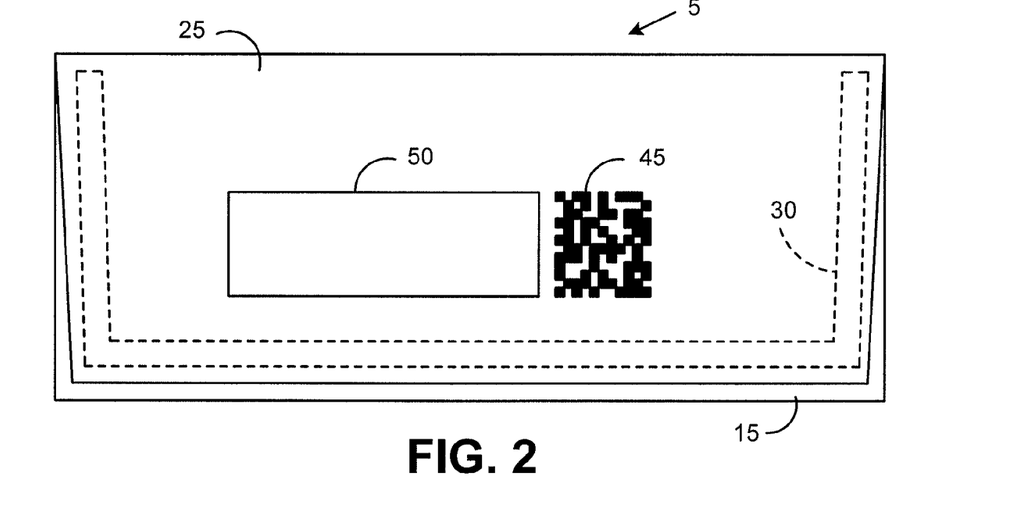

FIGS. 1 and 2 are schematic illustrations of an embodiment of a return envelope 5 that may be employed in the vote by mail system of the present invention. The return envelope 5 includes a front 10, a back 15, and an interior 20 defined by the front 10 and the back 15. The return envelope 5 also includes a flap 25 that is provided with an adhesive material 30 for enabling the return envelope 5 to be closed and sealed as shown in FIG. 2. As seen in FIG. 1, the back 15 of the return envelope 5 includes a voter address section 35 that is printed with the voter's name and mailing address by the registrar's office. As will be appreciated, the name and mailing address that are printed in the voter address section 35 will be the name and address that is provided by the voter at the time of registration. The back 15 also includes a signature pad 40 provided adjacent to the voter address section 35. When voting, the voter will complete the ballot for the election, insert it into the interior 20 of the return envelope 5, sign his or her name on the signature pad 40, and close the flap 25.

As seen in FIG. 2, the flap 25 includes the voter identification number of the voter which is assigned to the voter by the registrar at the time of registration and which uniquely identifies the voter to the registrar. In the preferred embodiment shown in FIG. 2, the voter identification number is provided in the form of a two-dimensional bar code 45 in order to facilitate the reading of the voter identification number by the registrar when the return envelope 5 is returned to the registrar. The flap 25 further includes a window 50 that is structured to cover the signature pad 40 when the return envelope 5 is closed. Preferably, the window 50 is made of a material which is opaque under normal conditions to thereby hide the signature provided on the signature pad 40 when, for example, the return envelope 5 is being returned in the mail, and is transparent under other conditions (such as ultraviolet light) in order to allow the signature provided on the signature pad 40 to be selectively read through the window 50 as described in, for example, co-pending application Ser. No. 11/641,207, assigned to the Assignee hereof.

Figure 3:
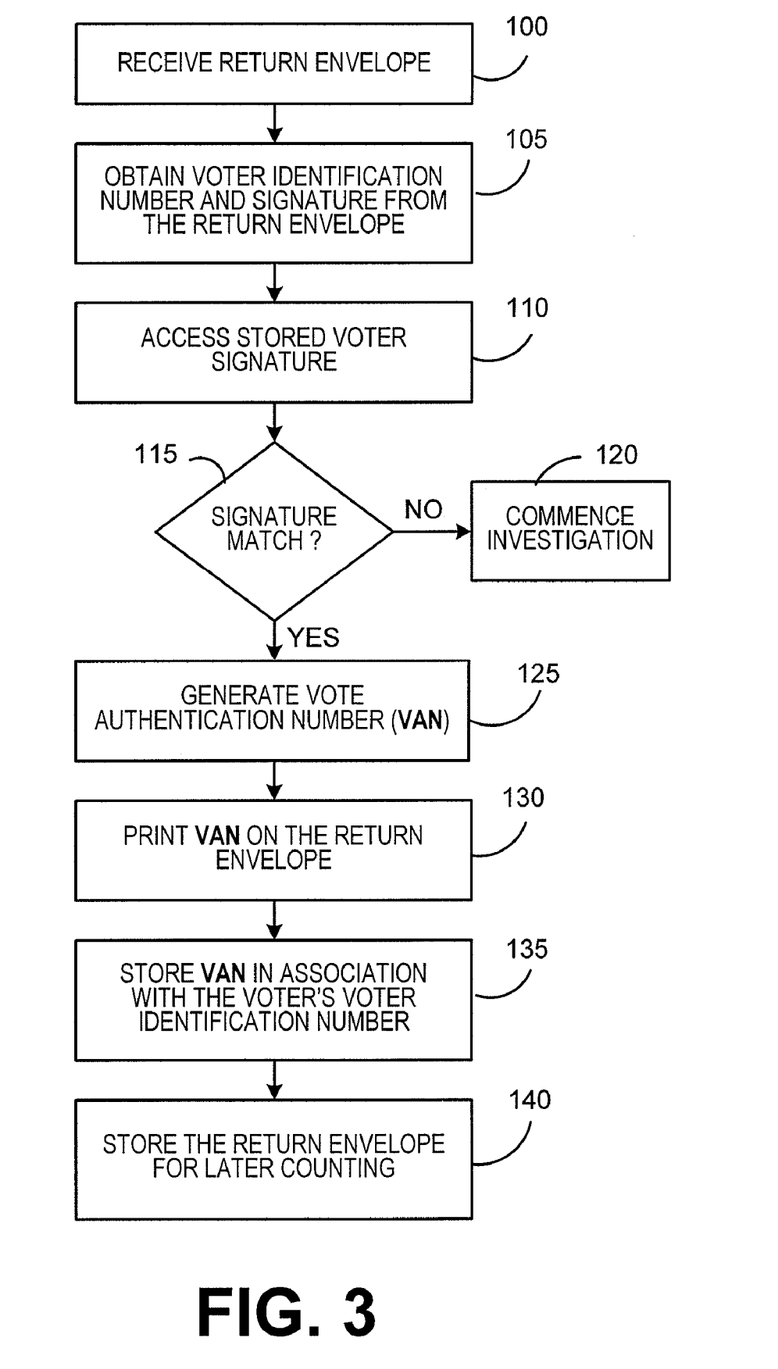
FIG. 3 is a flowchart which illustrates the steps that are performed according to an embodiment of the present invention for authenticating a return envelope when it is received at the registrar's office.

As discussed above, a voter is able to cast his or her vote by completing the ballot provided to him or her along with the return envelope 5, inserting the ballot into the interior 20 of the return envelope 5, providing his or her signature on the signature pad 40, closing the flap 25 and sealing the flap against the back 15 using adhesive 30, and mailing the return envelope 5 to the registrar's office (for this purpose, the registrar's address will preferably be pre-printed on the front 10 of the return envelope 5). As described elsewhere herein, the first process that the return envelope 5 must undergo when it is received by the registrar's office is an authentication process. FIG. 3 is a flowchart which illustrates the steps that are performed according to an embodiment of the present invention for authenticating a return envelope 5 when it is received at the registrar's office. While FIG. 3 describes the steps performed for one such return envelope 5, it will be appreciated that those steps will be performed for each return envelope 5 that is received from a voter.

Referring to FIG. 3, the process begins at step 100, wherein the return envelope 5 is received in the mail at the registrar's office. Next, at step 105, the voter identification number 45 and the signature from the signature pad 40 are obtained from the back 15 of the return envelope 5. Preferably, step 105 is performed automatically using, for example, a barcode reader for reading the voter identification number 45 and a scanner for creating an image of the signature provided on the signature pad 40. Next, at step 110, the voter's stored registration signature is obtained from, for example, a database maintained by the registrar (or a voting authority of which the registrar is a part). Preferably, the stored registration signature is accessed using the voter identification number 45 obtained in step 105. Then, at step 115, a determination is made as to whether the signature obtained from the return envelope 5 in step 105 matches the voter's registration signature accessed in step 110. Again, this is preferably performed automatically using image comparison software. If the answer at step 115 is no, meaning that the signatures do not match, then the process proceeds to step 120, wherein an investigation is commenced. Such an investigation will likely include contacting the voter associated with the voter identification number 45.

If, however, the answer at step 115 is yes, meaning that the signatures do match, then that means that the return envelope 5 has been authenticated. In such a case, the process proceeds to step 125, wherein a vote authentication number (VAN) is generated for the voter and the received return envelope 5 by the registrar using, for example, a pseudo random number generator. Next, in step 130, the VAN is printed on the return envelope 5, preferably on the flap 25 thereof adjacent to the window 50 and the voter identification number 45. In one particular embodiment (see FIGS. 6-8), the VAN is printed in the form of a series of digits that may later be read using optical character recognition (OCR) software. Alternatively, the VAN may be printed in the form of a barcode, such as a one or two-dimensional barcode, that may be later read using barcode reading software. At step 135, the VAN is then stored in association with the voter's voter identification number 45 in, for example, a database maintained by the registrar (or a voting authority of which the registrar is a part). Then, at step 140, the return envelope 5 is stored for later counting (FIGS. 4A and 4B).

Figure 4A:
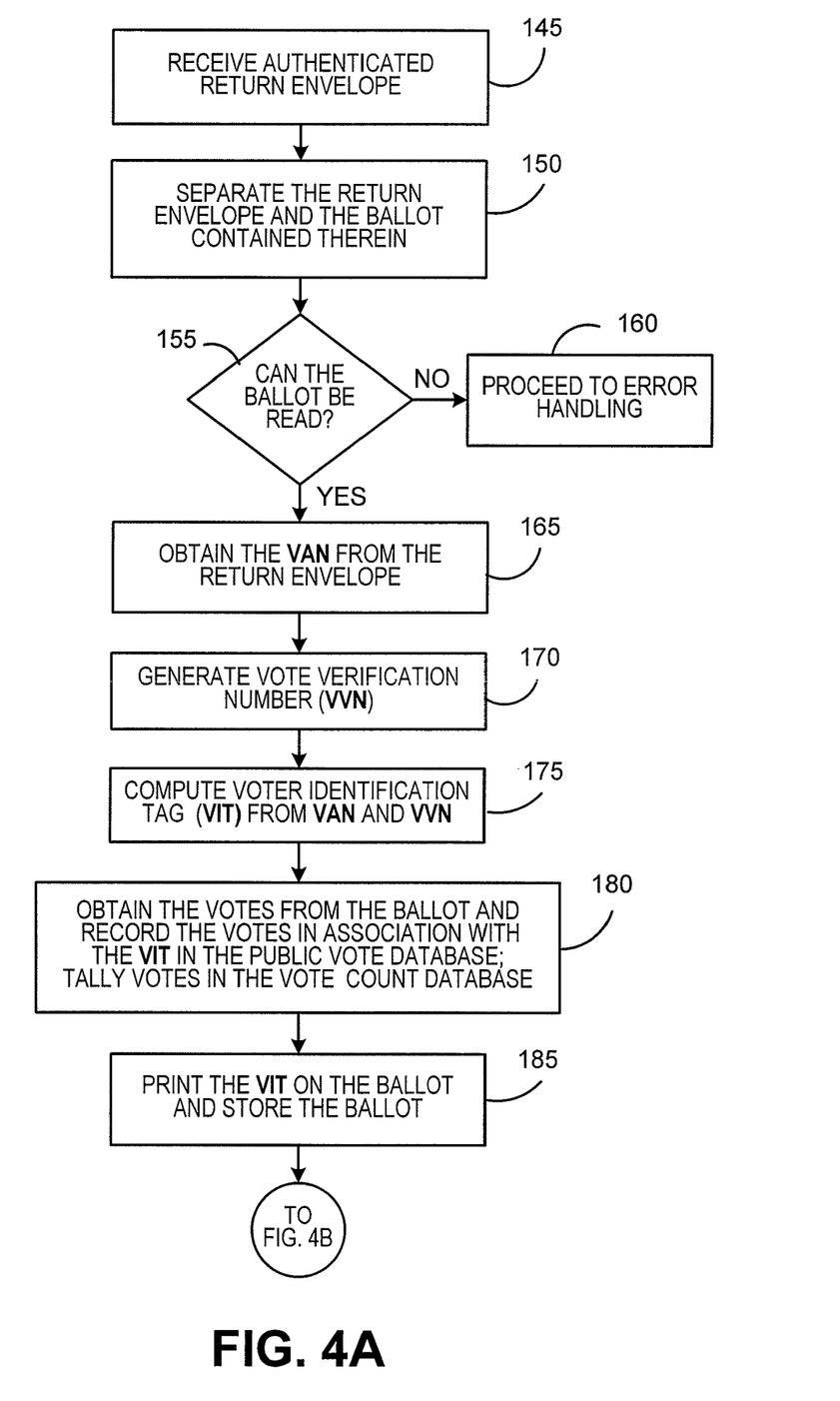
FIGS. 4A and 4B are a flowchart illustrating the steps performed during the process of counting the votes cast on received ballots according to an embodiment of the present invention.
Figure 4B:
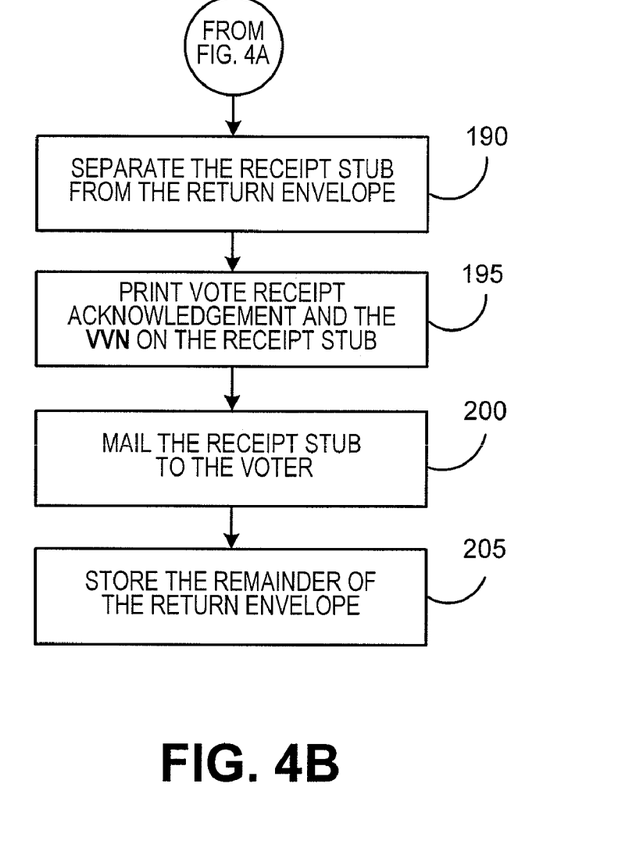
Figure 6:
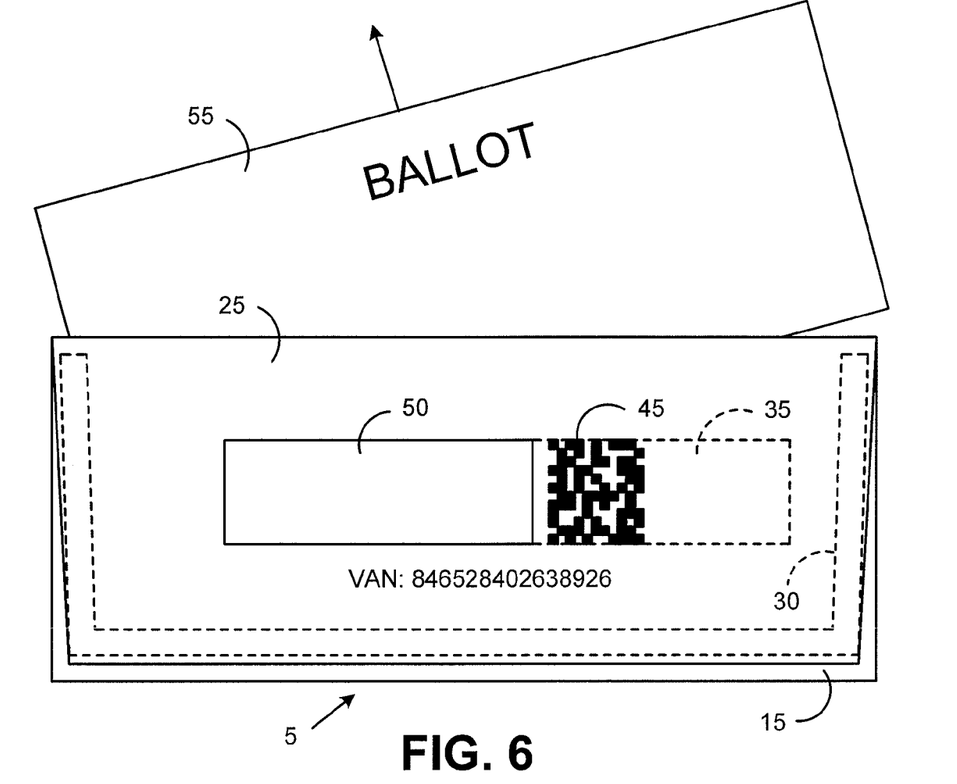
FIG. 6 is a schematic illustration of a ballot being removed from the return envelope of FIGS. 1 and 2.

FIGS. 4A and 4B are flowcharts illustrating the steps performed by the voting authority during the process of counting the votes cast on each authenticated ballot. In particular, FIGS. 4A and 4B illustrate the steps that are performed in connection with a single return envelope 5, but it will be appreciated that those steps will be performed for each return envelope 5 that is able to be authenticated in the manner shown in FIG. 3. The process begins at step 145, wherein the authenticated return envelope 5 is received for counting purposes (i.e., received from the store of such authenticated return envelopes 5 resulting from step 140 of FIG. 3). Next, at step 150, the return envelope 5 is opened and the ballot 55 contained therein is removed from and separated from the return envelope 5 as shown in FIG. 6. Then, at step 155, a determination is made as to whether the ballot 55 can be read using, for example, OCR software. If the answer at step 155 is no, then the ballot proceeds to step 160 for error handling, which may include a manual reading of the ballot and/or contacting the voter.

If, however, the answer at step 155 is yes, meaning that the ballot 55 can be successfully read, then, at step 165, the VAN is obtained from the return envelope 5 using, for example, OCR software, optical scan, and/or barcode reading software as appropriate depending in the format of the VAN. Next, at step 170, a vote verification number (VVN) is generated by the voting authority (i.e., the portion thereof responsible for vote counting) using, for example, a pseudo random number generator. Then, at step 175, a voter identification tag (VIT) is computed from the VAN obtained in step 165 and the VVN generated in step 170. In the preferred embodiment, the VIT is computed by inputting the VAN as a first argument into a hash function and the VVN as a second argument into the hash function (i.e., VIT=hash(VAN, VVN)).

Figure 7:
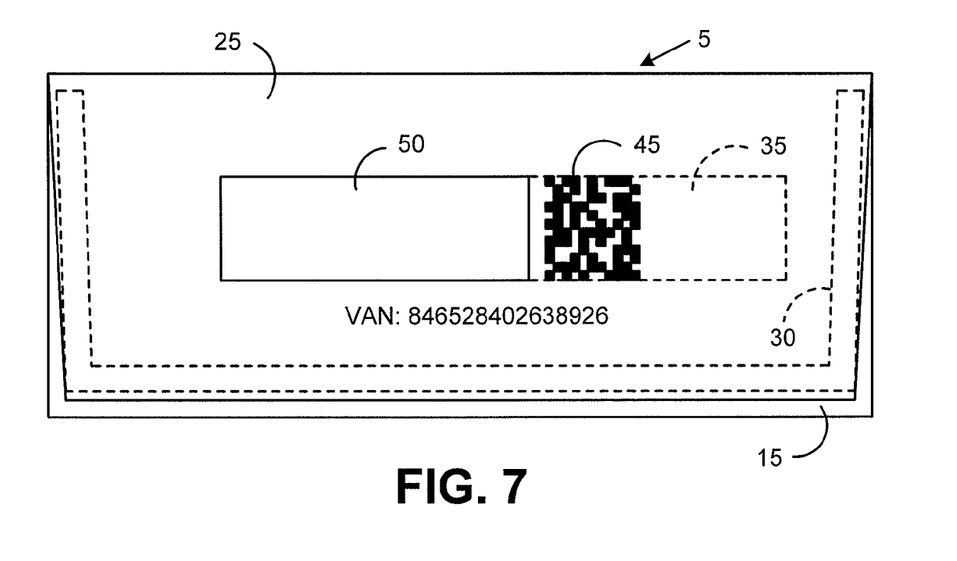
FIGS. 7 and 8 are schematic illustrations of one method of creating a receipt stub from the return envelope of FIGS. 1 and 2.
Figure 8:
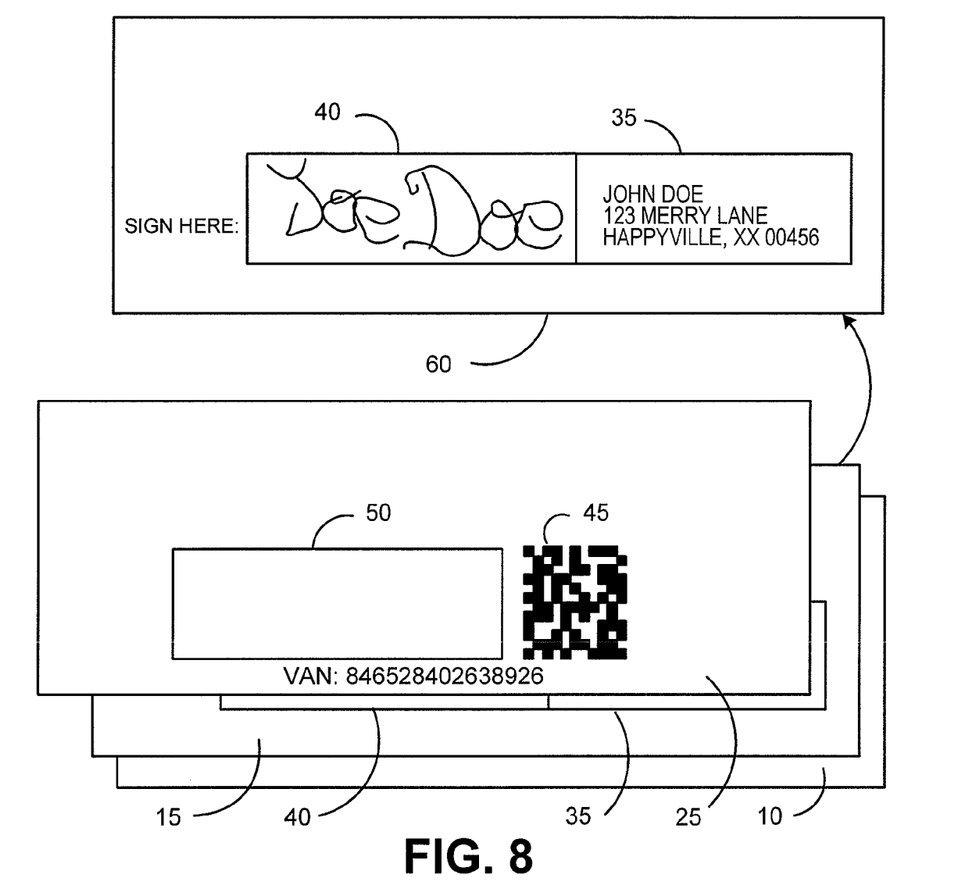

At step 180, the actual votes cast are obtained from the ballot 55 using, for example, OCR software, optical scan or other reading software, and such votes are recorded in association with the VIT in a public vote database maintained by the voting authority, the significance of which is described elsewhere herein. In addition, the votes that are obtained are tallied in a vote count database that is maintained by the voting authority. The VIT is then printed on the ballot 55 and the ballot is stored in step 185. Next, in step 190 (FIG. 4B), a receipt stub 60 is created from the back 15 of the return envelope 5. Specifically, in one particular embodiment, as shown in FIGS. 7 and 8, the receipt stub 60 is generated by cutting the return envelope 5 along the arrows shown in FIG. 7. As a result, as seen in FIG. 8, separate portions of the flap 25, the front 10, and the back 15 of the return envelope are created, with the portion of the back 15 that is created being the receipt stub 60.

Figure 9:
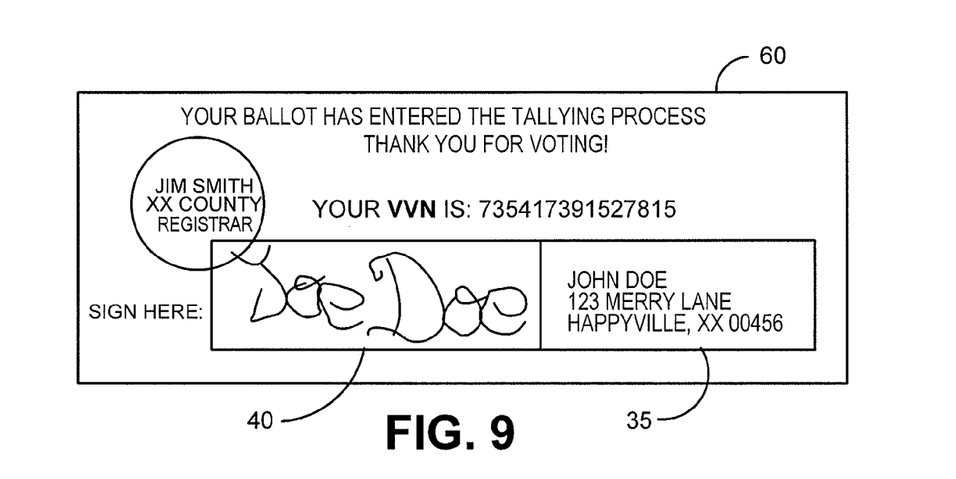
FIG. 9 is schematic illustration of a receipt stub according to an embodiment of the present invention.
Figure 10:
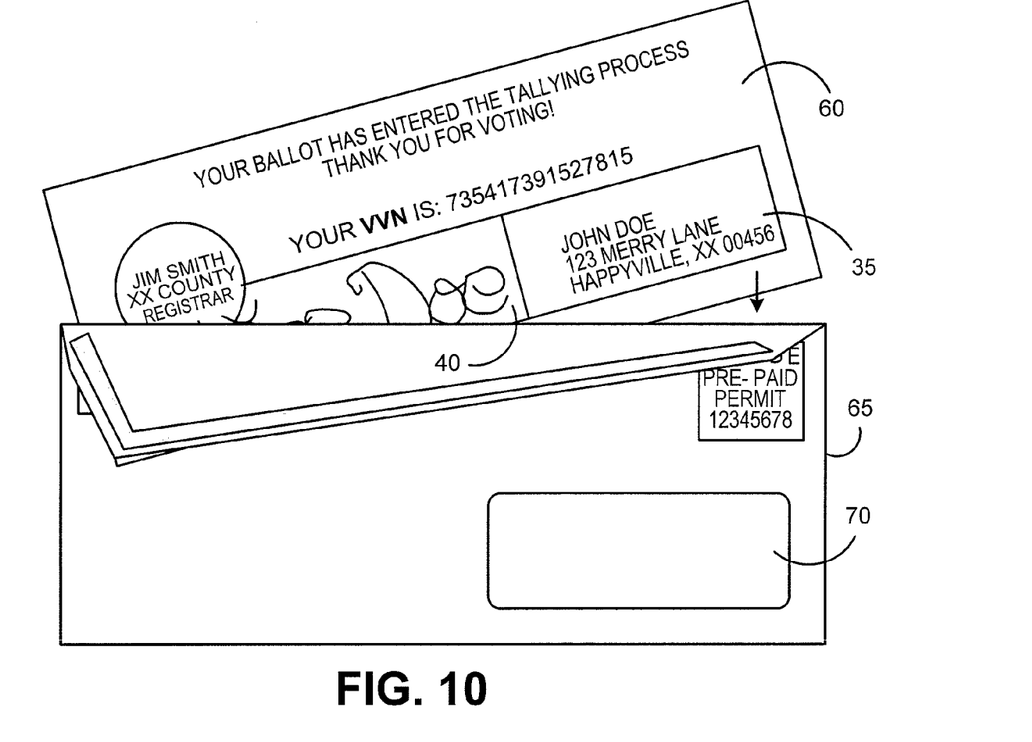
FIGS. 10 and 11 are schematic illustrations showing the receipt stub of FIG. 9 being mailed to a voter.
Figure 11:
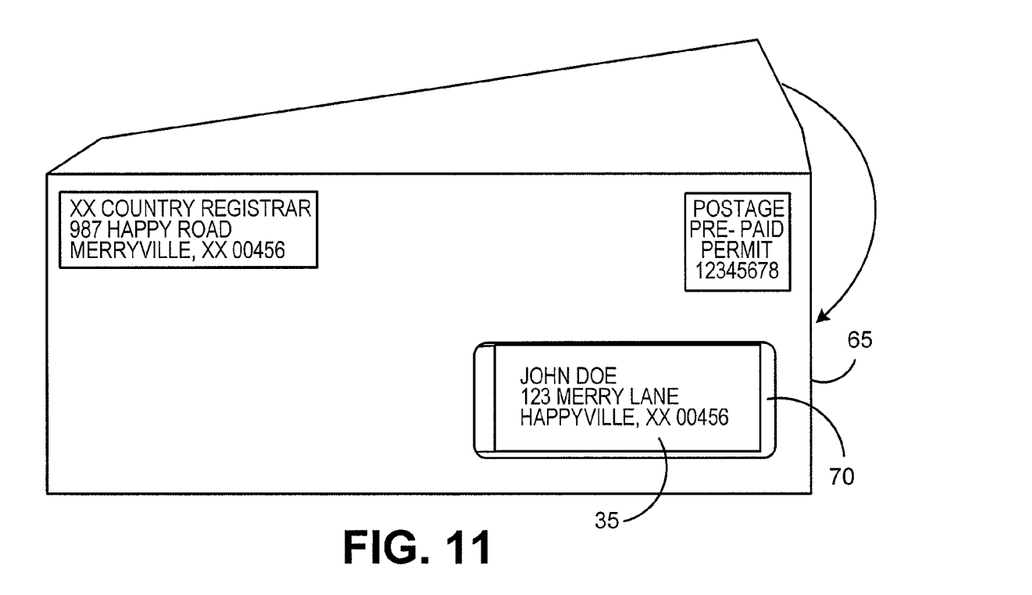

Next, in step 195, a vote receipt acknowledgement, preferably including a seal of the registrar, is printed on the receipt stub 60 along with the VVN that was generated in step 170 as seen in FIG. 9. The VVN may be printed in the form of a sequence of digits, which may later be read using OCR software, or in the form of a barcode, such as a two-dimensional or one-dimensional barcode, which may be later read using barcode reading software. At step 200, the receipt stub 60 is then inserted into an envelope 65 and is mailed to the voter using the address provided in the voter address section 35 as shown in FIGS. 10 and 11. The voter address section 35 is able to be seen through a window 70 provided as a part of the envelope 65. Finally, at step 205, the remainder of the return envelope 5, i.e., the portions of the flap 25 and the front 10 shown in FIG. 8, are stored for possible later forensic use by the voting authority.

Figure 12:
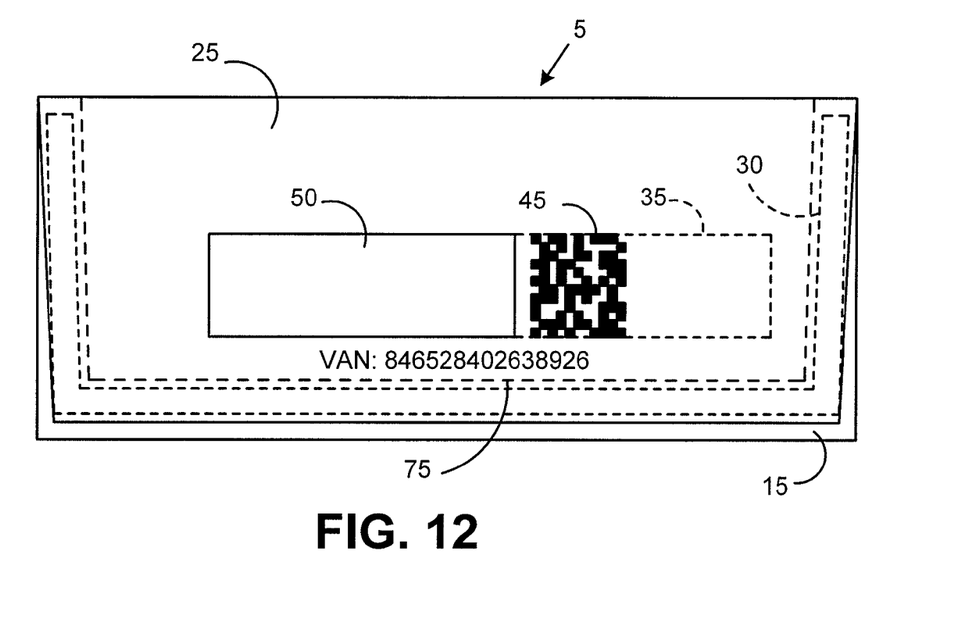
FIGS. 12 and 13 are schematic illustrations of an alternative method of creating a receipt stub from the return envelope of FIGS. 1 and 2.
Figure 13:
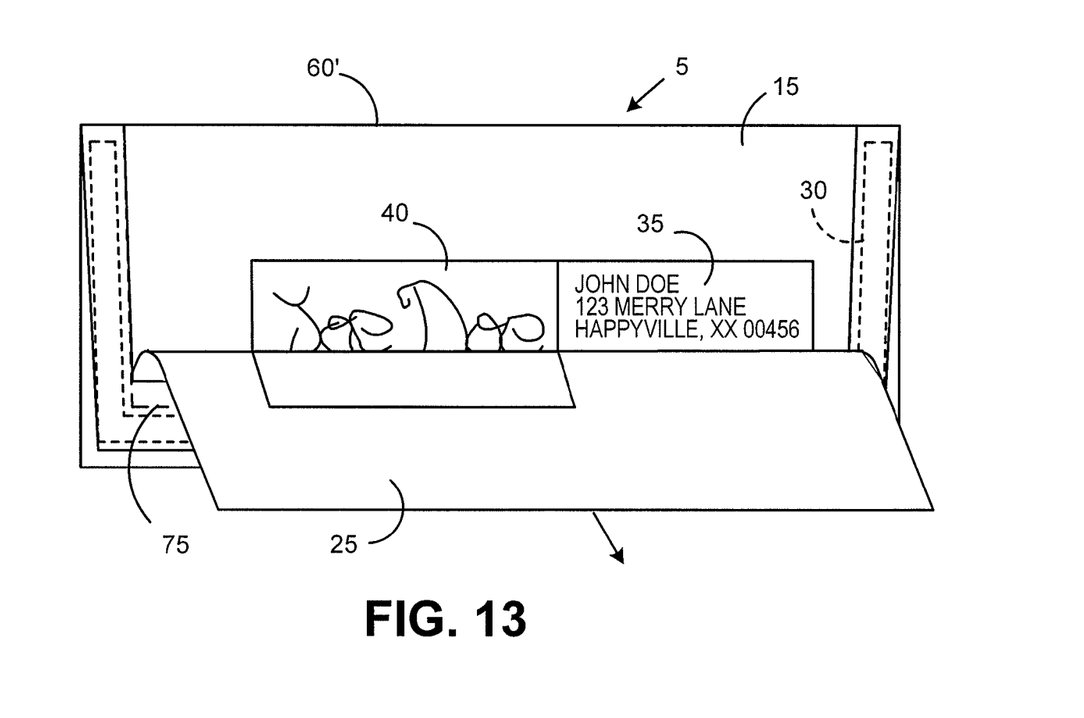

FIGS. 12 and 13 show a manner in which an alternative receipt stub 60' may be created. In particular, as seen in FIG. 12, the return envelope 5 in this embodiment is provided with a perforation 75 around the outer edge of the flap 25 that will enable a portion of the flap 25 to be removed as shown in FIG. 13. As a result, the front 10, the back 15, and a portion of the flap 25 that includes the adhesive 30 will remain and may be used as the receipt stub 60', onto which an acknowledgement and the VVN may be printed in the manner shown in FIG. 9.

In a further alternative, rather than generating a receipt stub 60 or 60' as described above, a separate mailpiece, such as a postcard, may be utilized as a receipt. In this embodiment, in step 195, the vote receipt acknowledgement and the VVN would be printed on the separate mailpiece, which in turn would be mailed to the voter at the appropriate address that is stored by the registrar. In this embodiment, the name and address of the voter may be obtained for use on the mailpiece in a number of ways. For example, that information can be obtained using OCR software from the return envelope 5 and reprinted on the mailpiece, or can be scanned in the form of an image from the return envelope 5 and reprinted on the mailpiece. Alternatively, the voter's voter identification number 45 may be obtained from the return envelope 5 and used to access the voter's name and address from a database maintained by the voting authority and then be printed on the mailpiece.

In still a further embodiment, a voter may be provided with a vote receipt acknowledgement and his or her VVN through an alternate form other than physical mail, such as by being informed of such information by a phone call, by an e-mail and/or by a posting on a dedicated webpage on the Internet. The posting or e-mail may include an image of the emptied return envelope 5 that was mailed by the voter. The voter may then take the VVN obtained in this manner and use it to verify his or her vote in the manner described in connection with FIG. 5 below.

Figure 5:
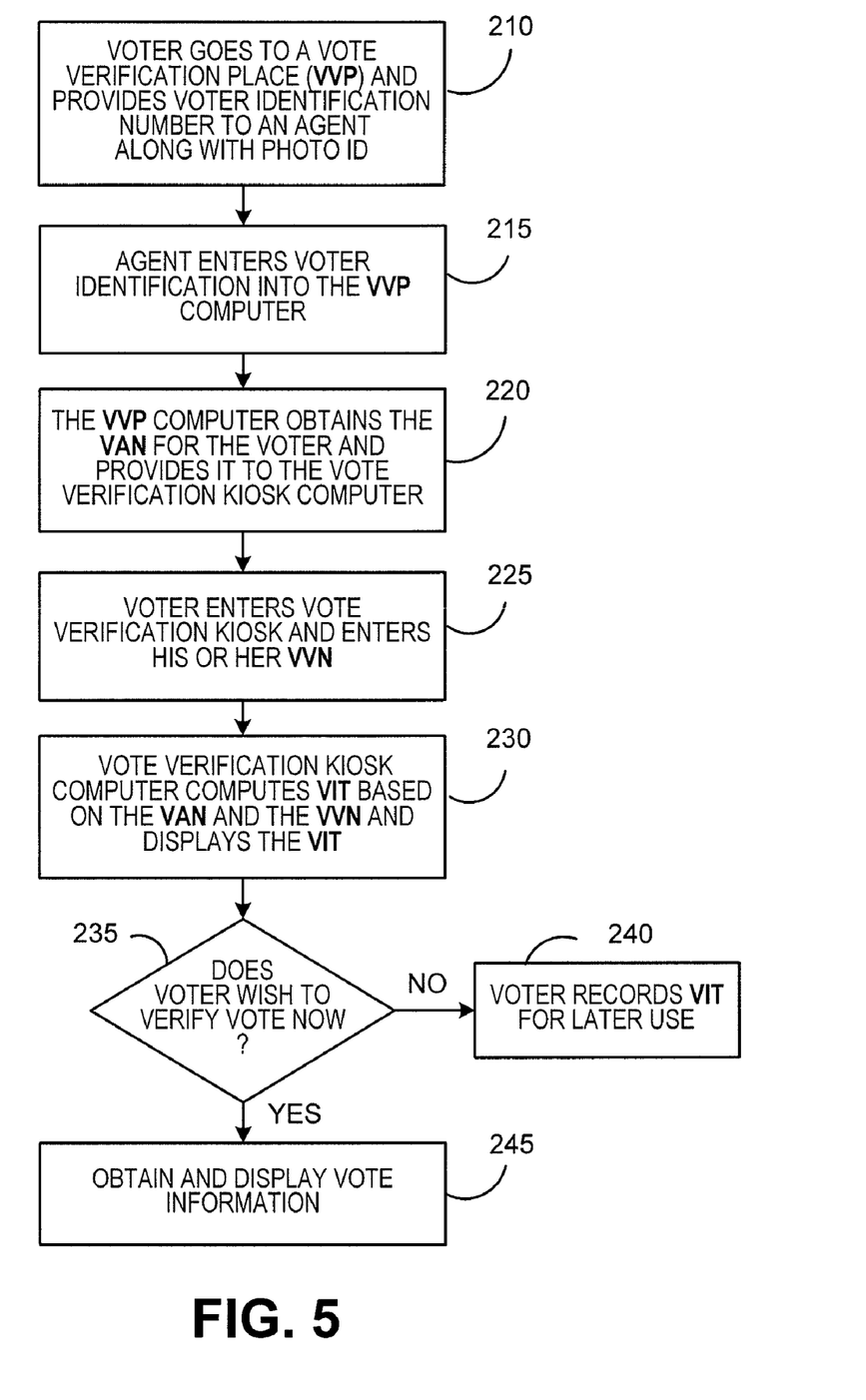
FIG. 5 is a flowchart showing the process by which a voter is able to verify that his or her vote has been counted as intended according to an embodiment of the present invention.

FIG. 5 is a flowchart showing the process by which the voter is able to verify that his or her vote has been counted as intended according to an embodiment of the present invention. The process shown in FIG. 5 contemplates that the registrar will maintain one or more vote verification places (VVPs) for enabling voters to verify their votes as described herein. Such VVPs will preferably include one or more computer enabled kiosks which may be used to access the public vote database, described elsewhere herein, that is maintained by the voting authority. For reasons described below, the VVPs will also include a VVP computer that is connected to the vote verification kiosk computers and that has access to the voting authority's computer systems, in particular to the database that stores the VANs of the voters that were generated during the election.

At step 210, a voter wishing to verify his votes goes to a VVP and provides his or her voter identification number to an agent at the VVP along with a photo identification. If the agent is able to positively ID the voter through the photo identification, the agent enters the voter's voter identification number into the VVP computer at step 215. Next, at step 220, the VVP computer obtains the VAN for the voter in question and provides it to the VVP computer. At step 225, the voter enters a vote verification kiosk and inputs his or her VVN (that was provided on the receipt stub 60 or 60' that was received by the voter) into the computer terminal of the voter verification kiosk. The voter may do this manually, or, alternatively, the voter verification kiosk may be provided with scanning equipment which is able to read characters and/or barcodes depending upon the format of the VVN. Then, at step 230, the vote verification kiosk computer computes and displays the VIT based on the VAN that was obtained in step 220 (and provided to the vote verification kiosk computer by the VVP computer) and the VVN that was entered at step 225. At step 235, a determination is made as to whether the voter wishes to verify his or her vote at that time. If the answer is no, then at step 240 the voter may record the VIT (displayed in step 230) and/or may obtain a printout of the VIT for later use in verifying his or her vote.

If, however, the answer at step 235 is yes, then the vote verification kiosk computer obtains from the public vote database that is maintained by the voting authority the vote information that was stored in connection with step 180 of FIG. 4A for the voter and displays that vote information to the voter in step 245. Such vote information will include the identity of each of the candidates and/or choices that were made by the voter and tallied in the election during step 180 of FIG. 4A. Following step 245, the voter will either determine that the vote information that is displayed matches his or her recollection, in which case the voter will be satisfied that his or her votes were counted as intended, or, alternatively, the voter will determine that there is a discrepancy between the vote information and what the voter believes he or she intended. In the case of the latter, the voter may then contact the voting authority in order to request that an investigation into the apparent discrepancy be commenced.

Moreover, in order to make sure that the election has not been rigged by vote stuffing, a list of all of the voters along with an indication of whether they have voted or not (i.e., whether they have a stored VAN or not) can be disclosed to an independent auditing organization who can conduct a survey and check that people who are recorded to have voted have actually done so, and people who are not recorded to have voted did not in fact vote. In addition, the auditing organization can determine whether the number of votes cast is equal to the number of people having voted (i.e., the number of people with a VAN). In addition, voters who have not voted may be able to verify that no vote has been recorded under their name. Specifically, a voter may be able to access his or her own voter database entry and verify that there is no VAN recorded (without being able to actually see the VAN, which should be kept secret).

Furthermore, if a voting system that allows vote verification is not carefully designed, it may allow for vote buying/selling and/or vote intimidation. Specifically, if a voter can verify his or her vote, it might be easy for someone else to verify that person's vote as well. As a result, a buyer can give a reward to a voter if he or she voted for the buyer's favorite candidate or candidates. The design of the vote by mail system of the present invention does not allow this to happen because of the following factors: (i) a buyer cannot find the VIT associated with a voter using only the voters VVN, (ii) a buyer would not be permitted to enter a vote verification kiosk without a photo ID indicating that the buyer is the voter, (iii) the buyer will not have access to the voters VAN (which is kept secret from everyone by the voting authority), and (iv) if the voter is let into a vote verification kiosk, the voter is not openly given his or her VAN, but instead the VAN is provided to the hash function by the public vote database computer as a hidden argument, so even in the vote verification kiosk, the voter cannot get to know his VAN and therefore cannot copy it and give it to a buyer.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of enabling a voter to verify that the voter's ballot has been received and counted as intended by the voter in a vote by mail election comprising:
   receiving the ballot from said voter in the mail;
   generating a vote verification number for said voter;
   generating and storing a vote authentication number for said voter;
   computing a vote identification tag for said voter using a hash function by using said vote authentication number as a first argument in said hash function and said vote verification number as a second argument in said hash function;

obtaining the voter's one or more votes from the ballot and counting the voter's one or more votes in said election;

storing voter vote information, said voter vote information including the voter's one or more votes that were counted in said election;

providing to said voter said vote verification number, and an acknowledgment that said ballot has been received and counted in said election; and after said ejection has been closed, receiving said vote verification number from said voter, obtaining said voter vote information from storage using said vote verification number and displaying said voter vote information for said voter.

2. The method according to claim 1, wherein storing said voter vote information comprises storing said voter vote information in association with said vote identification tag, and wherein obtaining said voter vote information from storage further comprises:

obtaining said vote authentication number from storage based on the identity of said voter;

using said received vote verification number and said obtained vote authentication number to generate said vote identification tag; and using said generated vote identification tag to obtain said voter vote information from storage.

3. The method according to claim 1, wherein receiving the ballot from said voter in the mail comprises receiving said ballot in a return envelope, and said method further comprises:

authenticating said return envelope using a signature provided on said return envelope.

4. The method according to claim 1, wherein providing to said voter said vote verification number and an acknowledgment that said ballot has been received and counted in said election further comprises:

mailing a mail piece to said voter that includes said vote verification number and said acknowledgment.

5. The method according to claim 4, wherein receiving the ballot from said voter in the mail comprises receiving said ballot in a return envelope, and wherein said mailpiece is created from said return envelope.

6. The method according to claim 5, wherein said return envelope includes a portion having a mailing address of said voter provided thereon, and wherein said mailpiece is created from said portion.

7. The method according to claim 6, wherein said portion further includes a signature of said voter.

8. The method according to claim 6, wherein said return envelope comprises a flap, a front and a back, wherein said back is said portion having said mailing address of said voter provided thereon, and wherein said mailpiece is created by separating at least part of said back from said front and said flap and printing said vote verification number and said acknowledgment on the at least part of said back.

9. The method according to claim 8, further comprising storing one or both of said flap and said front.

10. The method according to claim 6, wherein said return envelope comprises a flap, a front and a back, said flap having a perforation, wherein said back is said portion having said mailing address of said voter provided thereon, and wherein said mailpiece is created by removing a part of said flap from said return envelope by separating, along said perforation, said part of said flap from a remaining portion of said flap that is adhered to said back, thereby exposing said mailing address of said voter, and printing said vote verification number and said acknowledgment on said back.

11. The method according to claim 10, further comprising storing said part of said flap removed from said return envelope.

12. The method according to claim 4, wherein said vote verification number is provided on said mailpiece in a machine readable form.

13. The method according to claim 4, wherein said vote verification number is provided on said mailpiece in a human readable form.

14. The method according to claim 1, wherein receiving the ballot from said voter in the mail comprises receiving said ballot in a return envelope, the method further comprising:

printing said vote authentication number on said return envelope, wherein computing said vote identification tag for said voter comprises obtaining said vote authentication number from said return envelope.

15. the method according to claim 1, wherein receiving the ballot from said voter in the mail comprises receiving said ballot in a return envelope, and wherein obtaining the voter's one or more votes from the ballot comprises separating said ballot from said return envelope, the method further comprising printing the vote identification tag on said ballot and storing said ballot.

16. The method according to claim 1, wherein providing to said voter said vote verification number and an acknowledgment that said ballot has been received and counted in said election further comprises:

providing said vote verification number and said acknowledgment through one of a phone call placed to said voter, an email sent to said voter and a posting provided on a website accessible by said voter.

* * * * *